(12) United States Patent
Krammer et al.

(10) Patent No.: US 11,519,772 B2
(45) Date of Patent: Dec. 6, 2022

(54) LIQUID PRESSURE AND LEVEL SENSOR SYSTEMS AND SENSORS, METHODS, AND APPLICATIONS THEREFOR

(71) Applicant: Evigia Systems, Inc., Ann Arbor, MI (US)

(72) Inventors: Mark Krammer, Grass Lake, MI (US); Siva Aduri, Ann Arbor, MI (US); Navid Yazdi, Ann Arbor, MI (US)

(73) Assignee: Evigia Systems, Inc., Ann Arbor, MI (US)

( * ) Notice: Subject to any disclaimer, the term of this patent is extended or adjusted under 35 U.S.C. 154(b) by 611 days.

(21) Appl. No.: 16/436,488

(22) Filed: Jun. 10, 2019

(65) Prior Publication Data

US 2020/0064175 A1 Feb. 27, 2020

Related U.S. Application Data (60) Provisional application No. 62/850,909, filed on May 21, 2019, provisional application No. 62/722,839, filed on Aug. 25, 2018.

(51) Int. Cl.
| | | |
|---|---|---|
| *G01F 23/16* | (2006.01) | |
| *G01F 23/18* | (2006.01) | |
| *G01L 23/32* | (2006.01) | |

(52) U.S. Cl.
CPC .......... *G01F 23/167* (2013.01); *G01F 23/162* (2013.01); *G01F 23/164* (2013.01);
(Continued)

(58) Field of Classification Search
CPC ...... G01F 23/168; G01F 23/164; G01F 23/18; G01F 23/162
See application file for complete search history.

(56) References Cited

U.S. PATENT DOCUMENTS

| | | |
|---|---|---|
| 6,220,091 B1 | 4/2001 | Chen et al. |
| 2012/0067119 A1 | 3/2012 | Cronin et al. |

(Continued)

FOREIGN PATENT DOCUMENTS

| | | |
|---|---|---|
| JP | 07324964 | 12/1995 |
| JP | 09292272 | 11/1997 |

(Continued)

OTHER PUBLICATIONS

International Search Report & Written Opinion for International Application No. PCT/US2019/047893, dated Dec. 12, 2019.

*Primary Examiner* — Paul M. West
(74) *Attorney, Agent, or Firm* — Hartman Global IP Law; Gary M. Hartman; Domenica N. S. Hartman (57) ABSTRACT

Pressure sensor systems for measuring a liquid pressure and deriving a liquid level from the measured pressure using gas pressure sensing devices. In one embodiment, liquid pressure results in compression or decompression of a trapped gas (as an example, air), wherein the gas pressure is detected by a gas pressure sensing device directly or a gas pressure sensing device that is protected inside a flexible pouch filled with a liquid. In another embodiment, a gas pressure sensing device is packaged in a flexible pouch filled with an inert liquid to protect the sensing device and circuit thereof from external contaminants while accurately transferring pressure from the liquid through a protective barrier. Application of such sensors in a wireless flood or a wireless liquid level measurement system is described as well.

21 Claims, 8 Drawing Sheets

(52) U.S. Cl.
CPC ............ *G01F 23/168* (2013.01); *G01F 23/18* (2013.01); *G01L 23/32* (2013.01)

(56) References Cited

U.S. PATENT DOCUMENTS

| | | | | |
|---|---|---|---|---|
| 2012/0067133 | A1* | 3/2012 | Waldrop | G01F 23/14 |
| | | | | 73/753 |
| 2012/0325022 | A1* | 12/2012 | Shanebrook | G01F 23/16 |
| | | | | 73/862.581 |
| 2015/0211913 | A1* | 7/2015 | Murphy | G01F 23/185 |
| | | | | 702/55 |
| 2019/0185806 | A1* | 6/2019 | Patrício Domingues Gonçalves | G01F 23/168 |

FOREIGN PATENT DOCUMENTS

| | | |
|---|---|---|
| KR | 20110045858 | 5/2011 |
| WO | 2017139792 | 8/2017 |

* cited by examiner

LIQUID PRESSURE AND LEVEL SENSOR SYSTEMS AND SENSORS, METHODS, AND APPLICATIONS THEREFOR

CROSS-REFERENCE TO RELATED APPLICATIONS

This application claims the benefit of U.S. Provisional Application No. 62/722,839 filed Aug. 25, 2018, and U.S. Provisional Application No. 62/850,909, filed May 21, 2019. The contents of these prior patent documents are incorporated herein by reference.

STATEMENT REGARDING FEDERALLY SPONSORED RESEARCH OR DEVELOPMENT

This invention was made with partial government support under contract number: HSHQDC-17-C-00021 awarded by US Department of Homeland Security. The government has certain rights in the invention.

BACKGROUND OF THE INVENTION

The present invention generally relates to sensor systems adapted to sense liquid pressures and levels.

There are several industrial, environmental and consumer applications that require cost effective measurements of water or other liquids. The sensors need to operate in harsh environment and last for several years in these applications, especially in the case of industrial and environmental applications. Examples include measuring stream or storm water levels to generate flood warnings, ground water measurements, and tank liquid-level measurements. There are several rugged liquid pressure sensors reported in the prior art and several of them are commercially available. A large group of the commercially available liquid/water pressure sensors use strain gauge transducers that are in contact with the liquid directly or through a coating layer and upon application of water pressure are caused to move or deform, creating an electrical signal (e.g., in the form of an electrical resistance change) that the sensor interface electronics detects and processes. These sensors are often costly due to their complex construction and use of corrosion resistant stainless-steel components and assemblies. These sensors also often require frequent calibrations to correct for the change in their transducer mechanical properties after deployment in the field to correct for change in their output offset and scale factor, and to retain their accuracy.

BRIEF SUMMARY OF THE INVENTION

The present invention provides sensor systems that are capable of being mass produced and adapted for gas pressure measurements to produce cost-effective rugged water and/or liquid pressure sensors. The outputs of such sensors can be employed to calculate the liquid level of a liquid.

According to one aspect of the invention, a sensor system has a liquid level sensor that includes a tube having an open first end and a closed second end that is closed with a gas-tight sealing member containing a gas pressure sensing device adapted to sense a pressure of a gas within the tube. The first end is open to enable a liquid to enter the tube to define a chamber in which the gas is trapped and prevents contact between the liquid and the gas pressure sensing device. The sensor further includes electrical connections to the gas pressure sensing device that are routed through the gas-tight sealing member and comprise at least one set of cables, and electronic means for determining a level of the liquid outside the tube based on the pressure of the gas trapped within the tube.

According to another aspect of the invention, a sensor system has a liquid level sensor that includes a sealed pouch containing a pressure sensing device adapted to sense a pressure of a liquid in which the pouch is submerged, electrical connections to the pressure sensing device, and electronic means for determining a level of the liquid based on the pressure of the liquid sensed by the pressure sensing device.

Other aspects and advantages of this invention will be appreciated from the following detailed description.

DETAILED DESCRIPTION OF THE INVENTION

The disclosure herein describes approaches for creating high accuracy pressure sensors that can be relatively inexpensive and utilized for monitoring levels of liquids, including but not limited to water. Such sensors may have a resolution of about 0.1 inches or better, have a small size, and be corrosion resistance to various liquid types and temperatures. The sensors employ at least one MEMS pressure sensing device that is mounted to a printed circuit board that may contain all the circuitry the sensing device requires for operation to provide an electrical output signal. Preferred output signals of the sensing device(s) are digital.

One of the key challenges is to protect the sensing device and the printed circuit board from corrosion, debris, and elements in a liquid that would cause the electronics in the circuit to malfunction or report erroneous data. Another challenge is to assure that the sensing device provides accurate measurements of liquid levels over various liquid and gas pressures and though subjected to debris accumulation over time. Careful selection of material and sensing device structures are required to address these challenges without requiring frequent calibrations and complex compensation schemes. Two embodiments are described below as being capable of meeting the above challenges.

For convenience, consistent reference numbers are used throughout the drawings to identify the same or functionally equivalent elements. In a first embodiment represented in FIGS. 1 through 3, an immersible liquid level sensor 10 is represented as comprising a sensor tube 12 having a lower open end 14 and an oppositely-disposed upper end 16 closed with a sealing member 18 to form a gas-tight seal, a gas chamber 20 defined by and between the open and upper ends 14 and 16, and a gas pressure sensing device 22 embedded in the sealing member 18. The open end 14 is submerged in a liquid 24, such that a liquid pressure $P_L$ present at the open end 14 results in compression or decompression of air or another gas (sometimes referred to herein as air as a matter of convenience) trapped within the chamber 20, wherein the pressure of the trapped gas is detected by the gas pressure sensing device 22. In this approach, the sensing device 22 provides a measurement of a liquid level, in this case, the hydraulic height $h_L$ between the open end 14 of the tube 12 and the surface 26 of the liquid 24, without being in-contact with the liquid 24 as a column of the trapped gas within the chamber 20 isolates the pressure sensing device 22 from the liquid 24 that enters the tube 12 through its open end 14. In another embodiment represented in FIGS. 7 and 8, a gas pressure sensing device 22 is protected inside a flexible pouch 28 filled with an inert liquid 30 (for example, oil) to protect the sensing device 22 and its circuit from external contaminants while accurately transferring pressure transmitted from the liquid 24 through the pouch 28. In both embodiments, the level of the liquid 24 is calculated from the measured pressure of the liquid 24. The sensors 10 preferably utilize low-cost MEMS pressure sensing devices that can be mass produced and are commercially available, for example, such as barometric pressure sensing devices used by mobile phones and wearable electronics to sense altitude.

The level of a liquid (e.g., water) in a container, tank, moving or still body (e.g., a lake, stream, etc.) can be determined by the pressure of the liquid using Equation 1 below:

$$h = \frac{P_L - P_a}{D_L \cdot g} \quad \text{Eq. 1}$$

where h the liquid level, $P_L$ is the liquid pressure at the liquid level (i.e., at a distance below the liquid surface), $D_L$ is the mass density of the liquid, $P_a$ is the gas pressure above the liquid surface, and g the acceleration of an object due to gravity (about 9.81 m/s$^2$ on earth). Equation 1 captures a known physical relation that has been employed in several previously reported liquid-level sensors based on pressure sensing. Such level sensors relied on direct contact with the liquid whose level is being measured. Direct contact renders the sensors susceptible to drift and requires recalibration due to accumulation of residues, sludge, or corrosion of the pressure sensing element structures, which can change the mechanical properties of the sensor and thus its output response with pressure change. The difference among the temperature of coefficient of expansion of the pressures sensor structural components or with the potential accumulation of residues on the pressure sensor structural components also result in complex temperature compensation as the liquid or environment temperature changes.

Figure 1A:
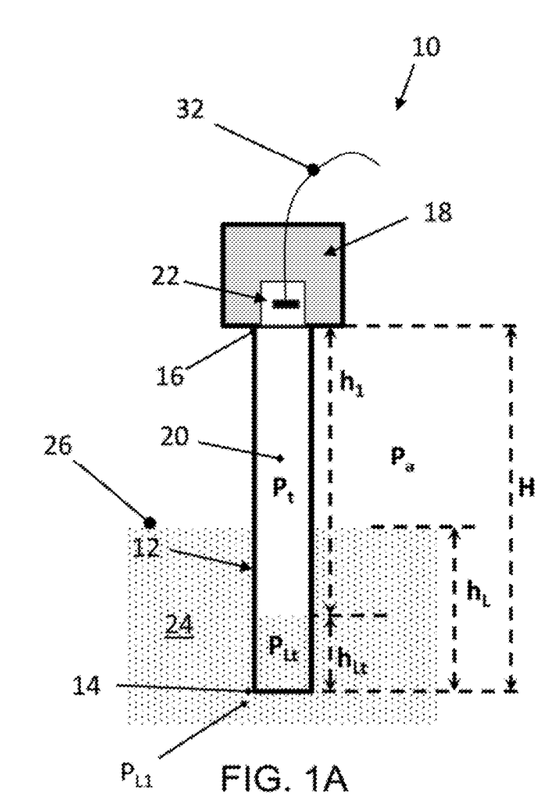
FIGS. 1A, 1B, and 1C represent an immersible liquid level sensor adapted to perform liquid level measurements by measuring the pressure of a gas trapped inside a sensor tube in accordance with a nonlimiting embodiment of the present invention. A gas chamber is defined by a space between the level ($h_{Lt}$) of a liquid that enters the tube through an open first end of the tube and a gas- and liquid-tight sealing member that contains a gas pressure sensing device and is located at a closed second end of the tube, such that the gas pressure ($P_t$) within the gas chamber varies corresponds to the liquid pressure ($P_{Lt}$) at the first end of the tube, which is a result of the level ($h_L$) of the liquid outside the tube. Three cases of liquid levels are shown in FIGS. 1A-1C.
Figure 1B:
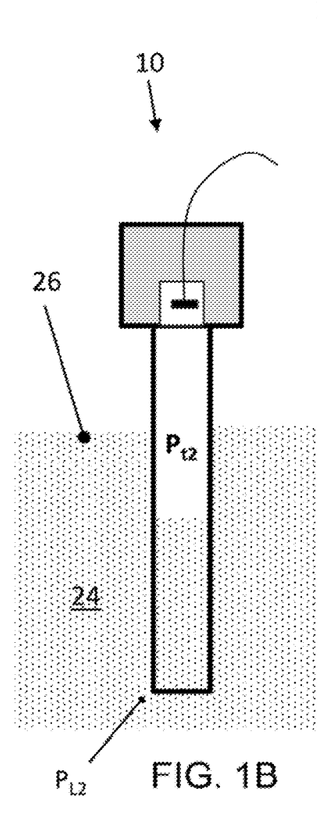
Figure 1C:
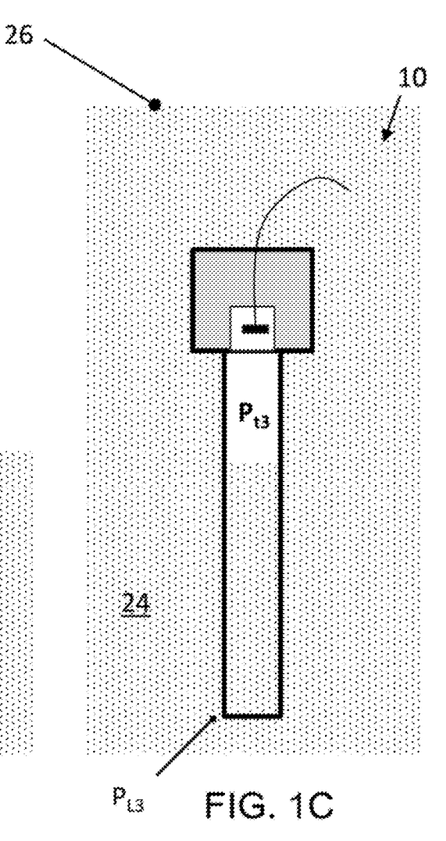

As previously described, FIGS. 1A-1C schematically show a nonlimiting embodiment of a liquid level sensor 10 that utilizes at least one pressure sensing device 22 that does not contact the liquid 24 being measured. The sensor 10 includes the sensor tube (or pipe) 12 with an open first end 14 and an upper second end 16 that is completely gas- and liquid-tight as a result of being closed with a sealing member 18 that includes the gas pressure sensing device 22. Electrical connections 32 to the gas pressure sensing device 22 are routed through the sealing member 18, for example, via at least one set of cables, as shown in FIGS. 1A-1C. The sensor 10 comprises the tube 12, sealing member 18, pressure sensing device 22, and electrical connections 32, and is adapted to determine the level of the liquid 24 on the basis of the liquid pressure sensed at the open end 14 of the tube 12. It is foreseeable that the sensor 10 could include signal conditioning, analog to digital conversion and data transmission circuitry. FIGS. 1A, 1B, and 1C represent the operation of the sensor 10 under different liquid levels. The operation of the sensor 10 is described through the following analysis and equations.

The open end 14 of the tube 12 is shown submerged in the liquid 24, such that the liquid 24 rises within the tube 12 to define a gas column within the chamber 20 and between the sealing member 18 and the surface of the liquid 24 within the tube 12. In the case of the gas trapped in the chamber 20 is air, a sensed air pressure is initially $P_{a0}$ at the time that the liquid is present at but has not entered the open end 14 of the sensor tube 12, and is equal to the ambient air pressure above the surface 26 of the liquid 24 external of the tube 12. The sensing device 22 remains dry before and after the open end 14 of the tube 12 is submerged in the liquid 24. The output of the sensing element of the sensing device 22 becomes a non-zero value when the liquid 24 enters the open end 14 of the tube 12. As the distance that the open end 14 of the tube 12 is submerged increases (corresponding to a rising level of the liquid 24 outside the tube 12), the liquid 24 rises within the tube 12 as shown in FIGS. 1A-1C, and the liquid level to $h_{Lt}$ inside the tube 12 increases as shown by a comparison of FIGS. 1A, 1B, and 1C. The distance between the fluid level inside the sensor tube 12 and the air pressure sensing device 22 is identified as $h_1$. The sum of $h_{Lt}+h_1=H$, where H is the total length of the sensor tube 12.

Fluid physics laws indicate that the pressure at the open end 14 of the tube 12 is a result of the external liquid level ($P_L$) and the external ambient air pressure ($P_a$) equaling the sum of the pressure ($P_{Lt}$) generated by the liquid 24 inside the sensor tube 12 and the air pressure ($P_t$) inside the sensor tube 12 because the sensor tube 12 is air-tight. Thus:

$$P_L + P_a = P_{Lt} + P_t \qquad \text{Eq. 2}$$

Figure 2:
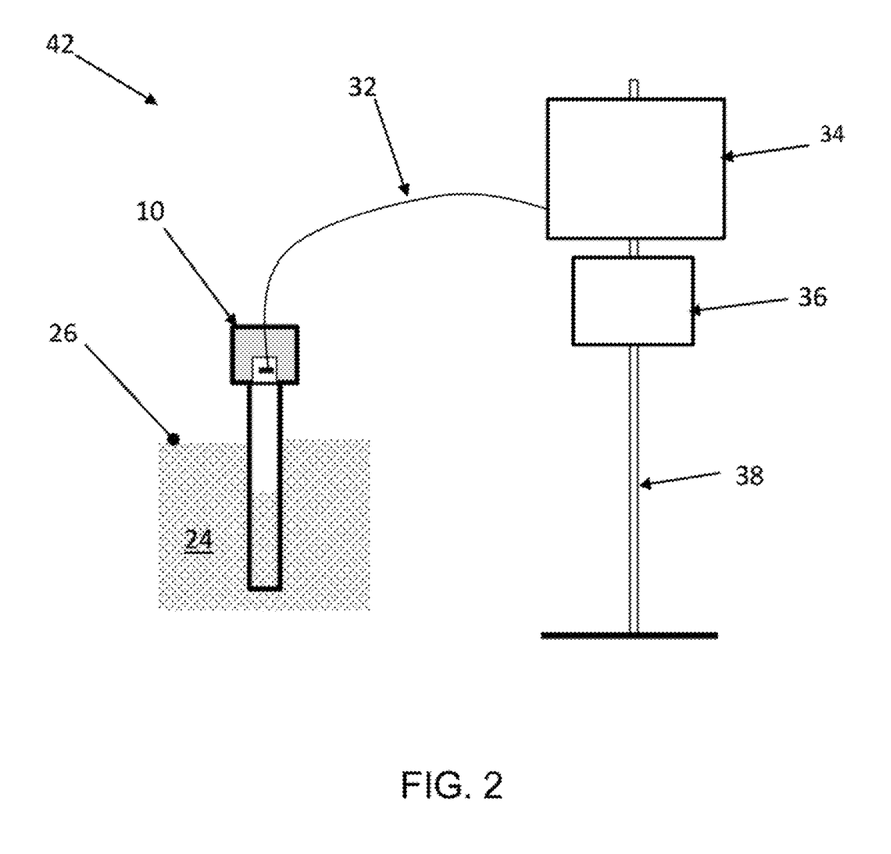
FIG. 2 represents a sensor system comprising an immersible liquid level sensor, such as the sensor represented in FIGS. 1A-1C, connected to an electronic unit that contains electronics for wireless communication and optionally sensor data processing.

Using the Ideal Gas Laws and Equations 1 and 2 above, the level ($h_L$) of the liquid 24 external to the tube 12 can be determined by measuring the air pressure ($P_t$) inside the tube 12 and the ambient air pressure (Pa) outside the tube 12 as shown in Equations 3-5:

$$h_L = \frac{P_t - P_a}{D_L \cdot g} + h_{Lt} \qquad \text{Eq. 3}$$

$$h_{Lt} = H\left(1 - \frac{P_{a0}}{P_t}\right) \qquad \text{Eq. 4}$$

$$h_L = \frac{P_t - P_a}{D_L \cdot g} + H\left(1 - \frac{P_{a0}}{P_t}\right) \qquad \text{Eq. 5}$$

where $P_{a0}$ is the ambient air pressure when the liquid level is at the open end 14 of the sensor tube 12 and forms the air column with an initial pressure of $P_t = P_{a0}$ inside the sensor tube 12. As the liquid level rises within the tube 12, the volume of the gas within the tube 12 decreases and its pressure increases. Equation 5 captures this relation in a closed form to calculate the liquid level. $P_t$ is provided by the pressure sensing device 22 in the sealing member 18 of the sensor tube 12, which may be an absolute pressure sensing device such as barometric pressure sensing device. $P_a$ is the local ambient pressure and can be sensed by an absolute pressure sensing device (not shown) located outside the tube 12. An absolute pressure sensing device can be located within an enclosure of a separate electronic unit 34 (FIG. 2) or obtained through local weather station data available through public data sources or third parties. Using a local pressure sensing device results in higher accuracy since it will include any local pressure variations in real-time. Absolute (barometric) pressure sensing devices are widely available at low-cost by MEMS sensor manufacturers due to their wide application in smart mobile phones, wearables and other mass scale consumer products.

The non-ideal gas law captured by Van Der Waals equation can be also employed to accommodate higher order non-linearities. In this case $h_{Lt}$ (the height of the liquid level inside the sensor tube 12, FIG. 1A) can be calculated by solving Equation 6 below and applying it in Equation 3 to calculate liquid level $h_L$:

$$P_t = \frac{1}{b - A(H - h_{Lt})} + \left[\frac{a(-b + A(H - h_{Lt}))}{A^2(H - h_{Lt})^2} - (-b + AH)\left(\frac{a}{A^2 H^2} + P_{a0}\right)\right] \qquad \text{Eq. 6}$$

where $P_t$ is measured, a=5.46 and b=0.0305 are the constants in the Van der Waals equation for water, and A is the cross-sectional area of the sensor tube 12.

In a particular liquid-level sensor design where H (the total length of the sensor tube 12) is limited to less than a few inches, it can be observed that a liner approximation of $h_L$ versus the difference between the measured air pressure ($P_t$) inside the sensor tube 12 and outside ambient air pressure ($P_a$) ($\Delta P = P_t - P_a$) results in an error of less than a few percent when the outside liquid level is tens of feet. A linear approximation further simplifies the calculation of liquid level versus the measured gas pressures inside and outside the tube 12.

An alternate approach is to measure the differential pressure inside the sensor tube 12 directly by adding at least one vent tube incorporated into the cables that form the electrical connections 32 to the pressure sensing device 22 inside the sensor tube 12, such that the sensor tube 12 remains air-tight while the pressure sensing device 22, in this case a differential pressure sensing device, simultaneously senses the gas pressure within the tube 12 and the outside ambient pressure transmitted by the vent tube. This approach incurs higher costs due to the addition of a vent hole and the use of a higher-cost differential gas pressure sensing device.

FIGS. 1B and 1C show the change in the air volume within the sensor tube 12 as the external liquid level increases, corresponding to the open end 14 of the sensor tube 12 being further submerged below the surface 26 of the liquid 24. This increase in air pressure within the chamber 20 inside the tube 12 and its nonlinear relation with the volume due to the gas law, results in an air column being maintained between the sensing device 22 and the surface of the liquid 24 within the tube 12 at all times. Therefore, the sensing device 22 is operating in a non-contact mode to protect it from the liquid 24, any debris or sludge in the liquid 24, and any corrosion induced or accelerated by the liquid chemistry. The result is a low-maintenance and highly durable precise liquid sensor.

Another advantage of the sensor 10 is that Equation 3 governs the relation between the liquid 24 and gas pressures and is independent of temperature if the pressures inside and outside the sensor tube 12 (or their difference) are directly measured. Therefore, if the gas pressure sensing device 22 is fully temperature compensated, then without any further temperature compensation the liquid level sensor 10 retains its liquid level accuracy across the environmental temperature variations. It is worth noting that many low-cost MEMS barometric air pressure sensing devices that are commercially available come with internal temperature compensation, which is performed at their manufacturer and therefore do not require further temperature compensation.

It is foreseeable that the sensor 10 can be used in different environments with other ambient gases and liquids, in which case the above equations can be employed to determine the liquid level $h_L$.

The sensor 10 represented in FIGS. 1A-1C results in non-contact between the liquid 24 and sensing device 22, and enables indirect measurements of the height ($h_1$) of the gas trapped within the tube 12 (indicative of the level ($h_{Lt}$) of the liquid 24 inside the tube 12) to determine the level ($h_L$) of the liquid 24 outside the tube 12. An alternative approach is to use other sensing devices, such as an ultrasound range finder, to directly measure $h_1$ by directly detecting the surface of the gas trapped within the tube 12.

FIG. 2 represents a sensor system 42 that uses the sensor 10 of FIGS. 1A-1C to measure liquid levels in remote locations, for example, to monitor floods and issue alerts. The sensor 10 transmits pressure readings to sensor data processing electronics within an electronic unit 34 that preferably also contains a wireless communication electronics. Pressure sensor data obtained from the sensor 10 are preferably converted into digital signals and transmitted over the electrical connections 32. Also, the outside ambient pressure sensing device (not shown) can be placed in the electronic unit 34 such that the liquid level can be calculated at the electronic unit 34 using pressure readings sensed within the sensor tube 12 and transmitted through a wireless link such as cellular, satellite, or other radio signals to remote data servers (also known as Cloud data servers) for further processing and data storage. The remote server application software could include a rules engine to generate alerts and transmit via email or SMS text service to users or interact with a user interface dashboard software to provide the liquid-level and its related data analytics. The enclosure of the electronic unit 34 may also contain internal rechargeable batteries (not shown) that are charged by an external solar panel 36 (FIG. 2). The electronic unit 34 and solar panel 36 can be mounted on different structures or the same structure, for example, a pole mounting structure 38 shown in FIG. 2. For one skilled in the art, it is foreseeable that the outside ambient pressure sensing device can be placed at other locations and sensor data processing for calculation of the liquid level can be performed at the sensing device itself or at a remote server. Also, it is foreseeable that various electronics, ports for connection of other sensors such as rain gauges, wind-sensors, soil moisture, and water clarity and quality sensors, or external power sources could be attached to or enclosed within the enclosure of the electronic unit 34 or any such devices could be integrated with it.

Figure 3:
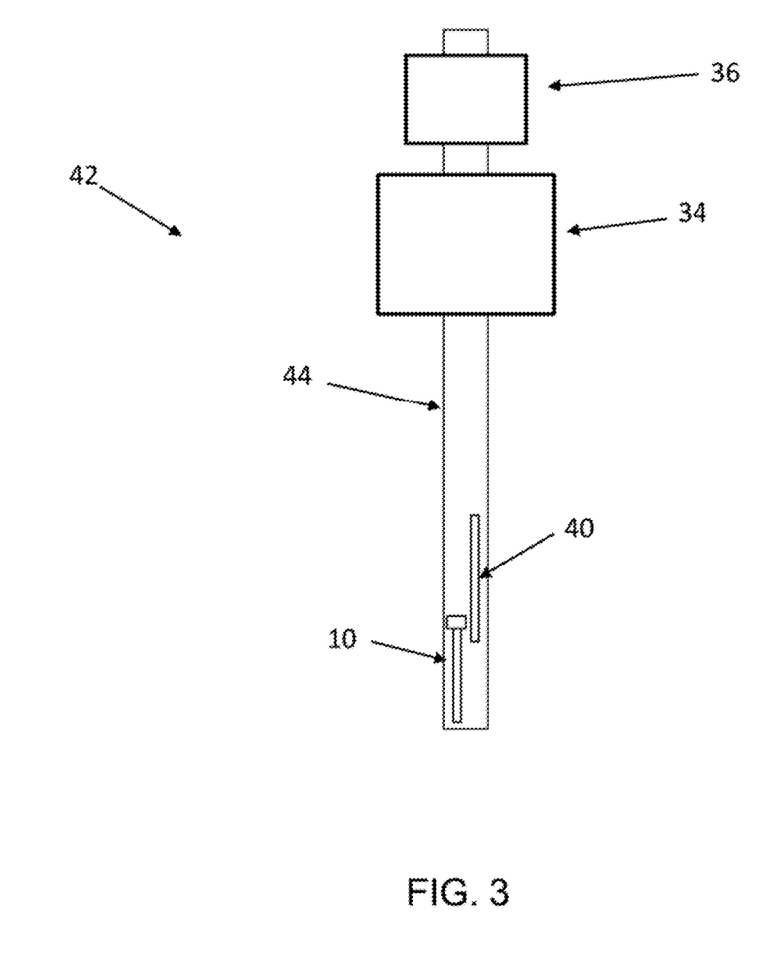
FIG. 3 represents a sensor system comprising a liquid level (pressure) sensor integrated with a liquid presence (contact) sensor within a protective shell in accordance with another nonlimiting embodiment of the present invention. The position of the liquid presence sensor is adjustable, such as with mechanical set screws or other mechanical fixturing methods.

One such additional sensor could be a liquid presence (contact) sensor. FIG. 3 shows an embodiment of a sensor system 42 having a liquid presence sensor 40 integrated with the liquid level sensor 10 within a protective shell 44 (represented as a tube). The protective shell 44 can also be employed as the mounting structure (38) for the solar panel 36 and the electronic unit 34, which as previously described may house the sensor data processing electronics, wireless communication electronics, and outside ambient pressure sensing device. The liquid presence sensor 40 may be mounted at an adjustable height within the protective shell 44 using set screws or other mechanical fixturing methods. The liquid presence sensor 40 can be employed to detect the surface 26 of the liquid 24 outside the tube 12 of the liquid level sensor 10 by directly detecting the liquid 24 within the protective shell 44, which permits the liquid 24 to freely enter the shell 44 such that the level of the liquid 24 within the shell 44 is the same as the level of the liquid 24 outside the shell 44. The liquid presence sensor 40 can be employed to trigger the operation of the liquid level sensor 10. Alternatively or in addition, the liquid presence sensor 40 can be employed to provide at least one data point of the level of the liquid 24, which in turn can be used to calibrate the liquid level sensor 10 or determine the liquid mass density of the liquid 24, which may vary with time.

Figure 4:
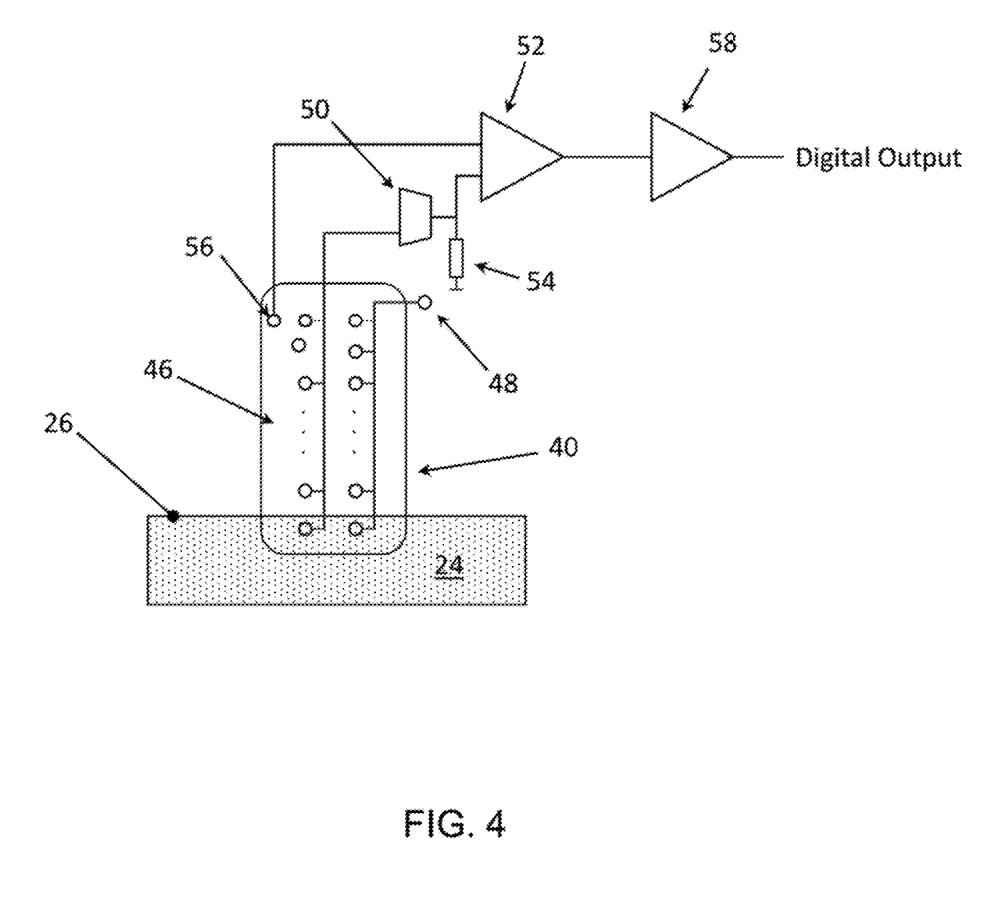
FIG. 4 represents a schematic of a liquid presence (contact) sensor with an exemplary interface electronics circuit.

The liquid presence sensor 40 may include multiple detection levels. FIG. 4 shows an implementation of a multi-level liquid presence sensor 40 where multiple pairs of electrical contacts 46 are placed at different heights (levels) on a non-electrically conductive backplate. At each level one of the contacts 46 is connected to a common fixed voltage 48, as a nonlimiting example, 3.3V. When the liquid 24 rises to the level of a particular pair of contacts 46 (e.g., the lowermost pair as depicted in FIG. 4), the liquid 24 directly contacts the pair of contacts 46 to create a resistive path between the pair of contacts 46, resulting in a voltage being generating at the contacts 46. This voltage can be detected through a multiplexer 50 that switches between the contacts 46 one at a time to scan their outputs and connect to the input of a differential amplifier 52. FIG. 4 shows the differential amplifier 52 at the output of the multiplexer 50 as including a resistor 54 to reduce the sensor contact node impedance and thus electro-magnetic interference (EMI), which could be sizeable at extremely high impedance nodes. The other input of the differential amplifier in this embodiment can be connected to a reference electrode 56 to mimic the EMI on the sense line and cancel it through differential readout. This reference electrode 56 is optional and may not be needed if resistance is less than 500 kilo-ohms. The output of the differential amplifier 52 is digitized with an analog to digital converter (ADC) 58 to obtain a digital output in this embodiment.

The moving structure of a MEMS pressure sensing device is typically constructed of silicon or polysilicon, which are resistant to corrosion and drift. Even so, the liquid level sensor 10 fabricated to comprise a MEMS pressure sensing device may benefit from having additional protective layers or coatings that transfer gas pressures to its moving structure.

Figure 5:
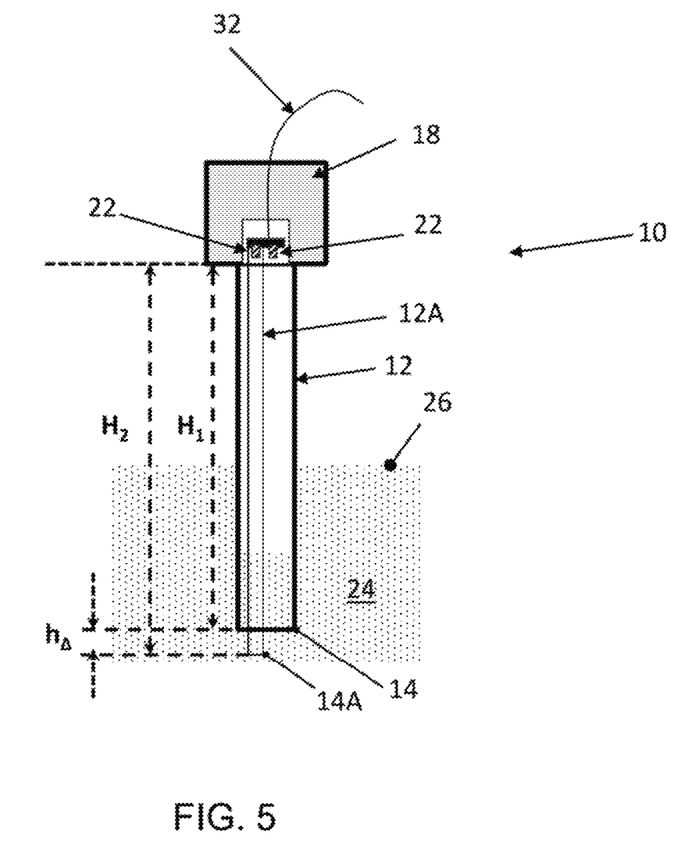
FIG. 5 represents a single liquid level sensor comprising multiple gas pressure sensing devices in accordance with a nonlimiting embodiment of the present invention.
Figure 6:
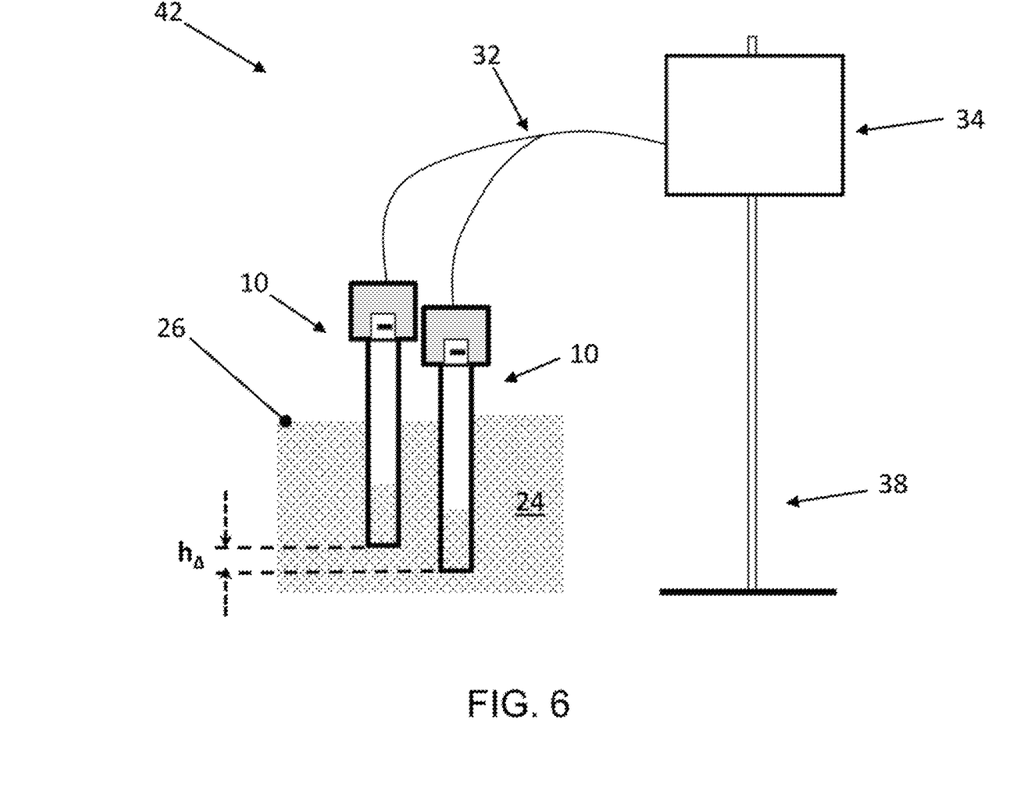
FIG. 6 represents a sensor system comprising multiple immersible liquid level sensors, each containing a gas pressure sensing device, in accordance with a nonlimiting embodiment of the present invention.

Another embodiment is represented in FIGS. 5 and 6, wherein at least one additional gas pressure sensing device 22 is included and configured in relation with the other gas pressure sensing device 22 to automatically calculate the mass density of the liquid 24 ($D_L$ in Equations 1, 3-5) to correct for variations in the mass density (self-calibration). This sensing arrangement may be desirable in applications such as storm water, stream, or flood monitoring in which the mass density of the liquid (water) 24 is likely to change depending on the conditions of the environment, for example, the presence of dirt or sludge in the liquid 24, or the liquid 24 being mixed with the ocean water in coastal areas. The liquid mass density can be calculated in this system if at least two gas pressure sensing devices 22 are mounted to have a fixed height offset ($h_A$) in the vicinity of each other. FIGS. 5 and 6 show two examples of this scheme, in which two gas pressure sensing devices 22 are mounted in the same liquid level sensor 10 (FIG. 5) or separately mounted in two separate liquid level sensors 10 (FIG. 6). In FIG. 5, the second sensing device 22 is embedded in the sealing member 18 of the liquid level sensor 10 and communicates with a separate tube 12A that is sealed around the second sensing device 22, disposed within the sensor tube 12, and has an open end 14A that extends beyond the open end 14 of the main sensor by a distance corresponding to $h_A$. The electrical connections 32 transmit readings from both sensing devices 22, or at least the reading of one device 22 and the difference in the readings of the devices 22, or the calculated liquid level and/or liquid mass density. Different combinations of the data obtained with the sensing devices 22 are needed to determine the liquid level and self-calibrate and correct for variations in the liquid mass density. In FIG. 6, a sensor system 42 is represented in which the two separate liquid level sensors 10 are mounted next to each other to have a height difference corresponding to $h_A$. Mounting of the sensors 10 can achieved by tightly attaching the two sensors 10 together and then mounting them within the liquid 24 in a similar approach as used to mount a single sensor 10. In either embodiment, readings of the two sensing devices 22 should differ by $h_A$, which is a known value, so the difference in the output of the two sensing devices 22 can be equated to $h_A$ and solved to determine $D_L$. It is worth noting that if the nonlinearity in Eq. 5 and 6 is negligible due to the short height (H) of the sensor tube(s) 12, the difference between the tube ambient pressure readings of the sensing devices 22 will be proportional to $D_L$ and solving for its value becomes even easier. All calculations can be performed by local sensor electronics or remotely (e.g., in Cloud servers).

Additional schemes for correction of the variation in the liquid mass density $D_L$ may include automatic software adjustment with geographical area, height of water, temperature, etc. One example is for flash flooding detection on dry surfaces, in which case the first few inches of flood water may have a higher mass density due to containing a higher concentration of dirt or sludge, with the local mass density decreasing as the water height increases. The geographical location of the sensor 10 and its vicinity could affect the correction model that is used. It is worth noting that the self-calibration and correction schemes provide higher accuracy that may be desirable or necessary depending on the particular application and its degree of accuracy requirements.

Figure 7:
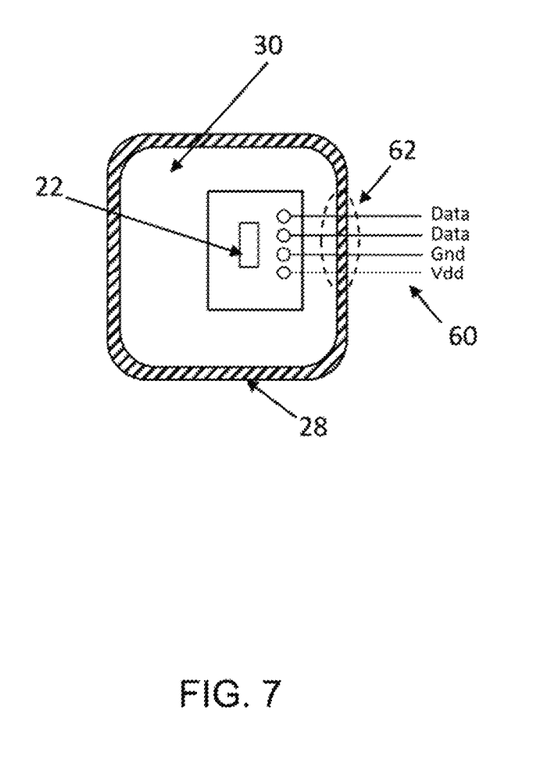
FIG. 7 represents a liquid pressure sensing device comprising a MEMS pressure sensing device on a circuit board packaged within a protective flexible pouch filled with an inert liquid, such as an oil, in accordance with another nonlimiting embodiment of the present invention.

FIG. 7 represents the nonlimiting embodiment of the invention in which the pressure sensing device 22 of the liquid level sensor 10 is placed in the pouch 28 filled with an inert liquid 30, for example, an oil, and sealed from the external environment while enabling transfer of pressure from all directions to the pressure sensing device 22. The liquid 30 within the pouch 28 provides a hydraulic interface between the walls of the pouch 28 and the sensing device 22 with the pouch 28. Also, the liquid 30 within the pouch 28 may be selected to protect the sensing device 22 and electronics from corrosion over time. The walls of the pouch 28 also preferably serve as a chemical-resistant membrane. The pouch 28 and interface wires 60 for the sensing device 22 may be heat sealed to provide a permanent liquid and gas-tight barrier 62 that isolates the sensing device 22 and its electronics from the liquid 24. The overall use of the pouch 28 and heat sealing may lower the manufacturing cost of the sensor 10 compared with other schemes reported in the prior art for environmental isolation and protection of sensing devices. It is worth noting that air bubbles in the liquid 30 within the pouch 28 may result in reduced temperature sensitivity, causing slight errors in pressure readings that are preferably eliminated or compensated for. To remove any such bubbles, the liquid 30 can be filled through an opening in a corner of the pouch 28 to provide an escape route for any air bubbles that may have occurred during fill. The corner is then sealed after all bubbles are removed.

Materials for the pouch 28 that are heat sealable and resistant to chemicals and salt include, but are not limited to, polytetrafluoroethylene (PTFE), polypropylene, polyethylene, and ultra-high molecular weight (UHMW) plastics. The thickness of the walls of the pouch 28 will affect the resolution and accuracy of the pressure readings of the pressure sensing device 22 therein. A 5 mil (about 0.1 mm) thick material has been shown to provide acceptable results. A 10 mil (about 0.25 mm) thick material reduces the resolution by approximately half. The pouch 28 containing the sensing device 22 can be also placed directly in contact with the liquid 24 to measure its pressure level, since it is isolated from the environment by the chemically and corrosion resistant pouch 28.

Figure 8:
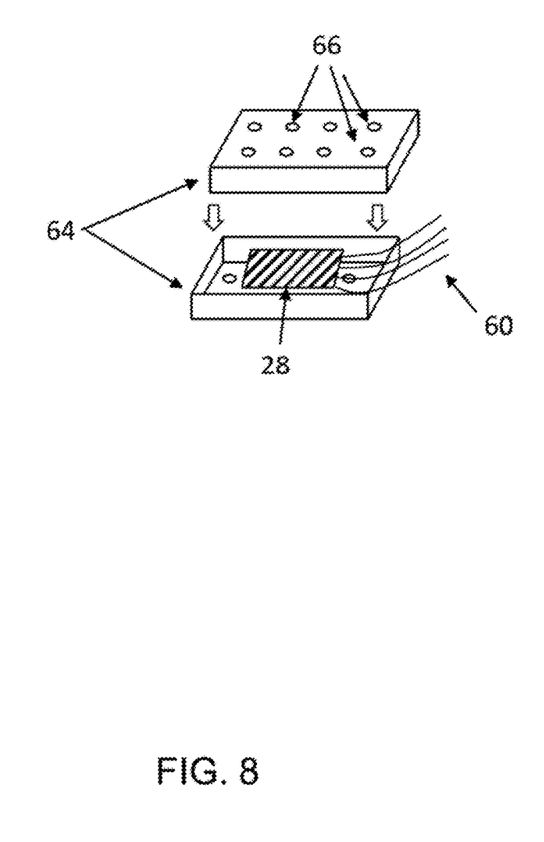
FIG. 8 represents the pouch of FIG. 7 as adapted to be enclosed within a protective case to protect the pouch from puncture or abrasion damage in accordance with another nonlimiting embodiment of the present invention. The case is resistant to impact and chemicals and is populated with small holes to allow liquids and gases to enter the case while excluding debris that could damage the pouch or the sensing device therein.

FIG. 8 shows a nonlimiting embodiment of the invention in which the sensor pouch 28 can be directly placed in a liquid 24 and the pouch 28 itself is protected from puncture and abrasion damage as a result of being placed inside a protective case 64. The protective case 64 is preferably resistant to impact and chemicals, and at least one half of the case 64 has multiple holes 66 to allow a liquid or gas to pass through the case 64 while excluding debris that could damage the pouch 28 or the sensing device 22 within the pouch 28.

While the invention has been described in terms of particular embodiments, it should be apparent that alternatives could be adopted by one skilled in the art. For example, the sensors 10 and their components could differ in appearance and construction from the embodiments described herein and shown in the drawings, and functions of certain components of the sensors 10 could be performed by components of different construction but capable of a similar (though not necessarily equivalent) function, and various materials could be used in the fabrication of the sensors 10 and/or their components. As such, it should be understood that the above detailed description is intended to describe the particular embodiments represented in the drawings and certain but not necessarily all features and aspects thereof, and to identify certain but not necessarily all alternatives to the represented embodiments and described features and aspects. As a nonlimiting example, the invention encompasses additional or alternative embodiments in which one or more features or aspects of a particular embodiment could be eliminated or two or more features or aspects of different embodiments could be combined. Accordingly, it should be understood that the invention is not necessarily limited to any embodiment described herein or illustrated in the drawings, and the phraseology and terminology employed above are for the purpose of describing the illustrated embodiments and do not necessarily serve as limitations to the scope of the invention. Therefore, the scope of the invention is to be limited only by the following claims.

The invention claimed is:

1. A sensor system having a liquid level sensor that is immersible in a liquid having a level measured by the liquid level sensor, the liquid level sensor comprising:
 a tube having an open first end and a closed second end that is closed with a gas-tight sealing member in which a gas pressure sensing device is embedded so as to sense a pressure of a gas within the tube, the first end being open to enable the liquid in which the liquid level sensor is immersed to enter the tube to define a chamber in which the gas is trapped between the second end and a surface of the liquid within the tube and prevents contact between the liquid within the tube and the gas pressure sensing device, the tube and the first and second ends thereof being entirely immersible in the liquid;
 electrical connections to the gas pressure sensing device that are routed through the gas-tight sealing member and comprise at least one set of cables; and
 electronic means for determining a level of the liquid outside the tube based on the pressure of the gas trapped within the tube sensed by the gas pressure sensing device.

2. The sensor system of claim 1, wherein the gas pressure sensing device is an absolute air pressure sensing device inside the tube, the liquid level sensor further comprising an absolute pressure sensing device outside the tube and adapted to sense a local ambient gas pressure.

3. The sensor system of claim 2, wherein the absolute pressure sensing device outside the tube is located within an enclosure containing the electronic means.

4. The sensor system of claim 3, wherein the enclosure contains means for wirelessly transmitting data generated by the electronic means to a remote data server.

5. The sensor system of claim 4, further comprising remote server application software that includes a rules engine to generate alerts and transmit the alerts via email or SMS text service to users or interact with a user interface dashboard software to display the level of the liquid outside the tube data analytics related thereto.

6. The sensor system of claim 3, wherein the enclosure contains rechargeable batteries charged by an external solar panel.

7. The sensor system of claim 3, wherein the enclosure comprises one or more electronics or ports for connection to the one or more electronics chosen from the group consisting of rain gauges, wind-sensors, soil moisture sensors, water clarity and quality sensors, and external power sources.

8. The sensor system of claim 1, wherein the gas pressure sensing device is an absolute air pressure sensing device inside the tube, the liquid level sensor further comprising means for obtaining a local ambient gas pressure from local weather station data available through a public data source or a third party.

9. The sensor system of claim 1, wherein the gas pressure sensing device is a differential pressure sensing device, the liquid level sensor comprising at least a vent tube in the cables and connected to the gas pressure sensing device such that the gas pressure sensing device observes a local ambient gas pressure through the vent tube.

10. The sensor system of claim 1, wherein the electronic means further determines a height of the gas trapped within the tube based on the pressure of the gas trapped within the tube sensed by the gas pressure sensing device.

11. The sensor system of claim 1, wherein the gas pressure sensing device is a MEMS pressure sensing device having at least one moving structure and at least one protective layer or coating that transfers pressures to the moving structure.

12. The sensor system of claim 1, wherein the gas pressure sensing device is a first gas pressure sensing device of the sensor system, and the sensor system further comprises a second gas pressure sensing device.

13. The sensor system of claim 12, wherein the liquid level sensor is a first liquid level sensor of the sensor system and comprises the first gas pressure sensing device, the sensor system further comprises a second liquid level sensor that comprises the second gas pressure sensing devices, and the second liquid level sensor comprises a second tube having a closed end that contains the second gas pressure sensing device to sense a pressure of a gas within the second tube, the second tube having an open end arranged relative to the first end of the tube of the first gas pressure sensing device so that the second gas pressure sensing device is adapted to sense a different pressure than the pressure sensed by the first gas pressure sensing device to provide a self-calibration and correction schemes that includes calculating mass density of the liquid.

14. The sensor system of claim 1, wherein the electronic means corrects for variation in mass density of the liquid with software that adjusts for at least one of geographical area, height of the liquid, and temperature of the liquid.

15. A sensor system having a liquid level sensor that comprises:
a tube having an open first end and a closed second end that is closed with a gas-tight sealing member containing a gas pressure sensing device adapted to sense a pressure of a gas within the tube, the first end being open to enable a liquid to enter the tube to define a chamber in which the gas is trapped and prevents contact between the liquid and the gas pressure sensing device;
electrical connections to the gas pressure sensing device that are routed through the gas-tight sealing member and comprise at least one set of cables; and
electronic means for determining a level of the liquid outside the tube based on the pressure of the gas trapped within the tube sensed by the gas pressure sensing device; and
at least one of an ultrasound range finder as means for directly measuring a height of the gas trapped within the tube and a liquid presence sensor that directly detects the level of the liquid outside the tube.

16. The sensor system of claim 15, wherein the liquid level sensor comprises the liquid presence sensor that directly detects the level of the liquid outside the tube.

17. The sensor system of claim 16, further comprising a protective shell that contains the liquid presence sensor and the liquid level sensor.

18. The sensor system of claim 17, wherein the liquid presence sensor is adjustably mounted within the protective shell.

19. The sensor system of claim 17, wherein the liquid presence sensor is adapted to provide at least one data point corresponding to the level and/or mass density of the liquid to calibrate the liquid level sensor.

20. The sensor system of claim 17, wherein the liquid presence sensor is a multi-level sensor comprising multiple pairs of electrical contacts at different heights on a non-electrically conductive backplate.

21. A sensor system having a liquid level sensor comprising:
a tube having an open first end and a closed second end that is closed with a gas-tight sealing member containing a gas pressure sensing device adapted to sense a pressure of a gas within the tube, the first end being open to enable a liquid to enter the tube to define a chamber in which the gas is trapped and prevents contact between the liquid and the gas pressure sensing device;
electrical connections to the gas pressure sensing device that are routed through the gas-tight sealing member and comprise at least one set of cables; and
electronic means for determining a level of the liquid outside the tube based on the pressure of the gas trapped within the tube sensed by the gas pressure sensing device;
wherein the gas pressure sensing device is a first gas pressure sensing device of the sensor system, and the sensor system further comprises a second gas pressure sensing device;
wherein the liquid level sensor comprises the first and second gas pressure sensing devices, the tube of the liquid level sensor is a first tube thereof, and the liquid level sensor comprises a second tube that has a closed end containing the second gas pressure sensing device, the second tube having an open end that projects outside the first end of the first tube so that the second gas pressure sensing device is adapted to sense a different pressure than the pressure sensed by the first gas pressure sensing device to provide a self-calibration and correction schemes that includes calculating mass density of the liquid.

\* \* \* \* \*